United States Patent
Li

(10) Patent No.: US 11,805,947 B2
(45) Date of Patent: Nov. 7, 2023

(54) SPATULA

(71) Applicant: Byondy Inc., Taipei (TW)

(72) Inventor: Jung chau Li, Taipei (TW)

(73) Assignee: Byondy Inc., Taipei (TW)

( * ) Notice: Subject to any disclaimer, the term of this patent is extended or adjusted under 35 U.S.C. 154(b) by 22 days.

(21) Appl. No.: 17/560,306

(22) Filed: Dec. 23, 2021

(65) Prior Publication Data

US 2022/0202257 A1  Jun. 30, 2022

(30) Foreign Application Priority Data

Dec. 24, 2020  (TW) ................. 109146042

(51) Int. Cl.
*A47J 43/28*  (2006.01)

(52) U.S. Cl.
CPC .................. *A47J 43/288* (2013.01)

(58) Field of Classification Search
CPC ...... A47J 43/288; A47J 43/283; A47J 43/281; A47J 43/1087
USPC ......................................................... 294/7
See application file for complete search history.

(56) References Cited

U.S. PATENT DOCUMENTS

| | | | | |
|---|---|---|---|---|
| 4,817,229 A * | 4/1989 | Sedillo | ............... | E04F 21/1652 |
| | | | | 15/245.1 |
| 5,535,484 A * | 7/1996 | Gibson | ................. | B25G 1/102 |
| | | | | 294/7 |
| D374,157 S * | 10/1996 | Hill | ............................... | D7/692 |
| 5,774,994 A * | 7/1998 | Stein | ....................... | B25G 1/04 |
| | | | | 30/162 |
| 6,049,947 A * | 4/2000 | Lu | ............................ | B25G 3/18 |
| | | | | 403/327 |
| 6,247,736 B1 * | 6/2001 | Esterson | ............... | A47J 43/288 |
| | | | | 294/7 |
| D458,090 S * | 6/2002 | Veltri | ............................ | D7/688 |
| D459,638 S * | 7/2002 | Wang | ............................. | D7/692 |
| 6,675,483 B2 * | 1/2004 | Bond | .................... | A47J 43/288 |
| | | | | 362/120 |
| D830,139 S * | 10/2018 | Li | ............................... | D7/688 |
| 10,398,261 B2 * | 9/2019 | Li | ........................ | A47J 43/288 |
| D905,501 S * | 12/2020 | Hanks | ........................ | D7/401.2 |
| 2003/0122388 A1 * | 7/2003 | Yeung | .................. | A47J 43/288 |
| | | | | 294/7 |

* cited by examiner

*Primary Examiner* — Paul T Chin

(57) ABSTRACT

A spatula includes a shovel portion, a reinforcing piece, a shovel handle and a coating layer. The reinforcing piece is provided on the shovel portion. The shovel handle has a connecting end connected to the reinforcing piece. The coating layer coats the shovel portion and the reinforcing piece and extends to the connecting end. The spatula has the advantages of smaller thickness, good structural strength and smaller weight.

12 Claims, 17 Drawing Sheets

100

SPATULA

FIELD OF THE INVENTION

The present invention relates to a kitchen utensil, and more particularly to a spatula.

BACKGROUND OF THE INVENTION

The existing spatulas are roughly divided into metal spatulas, silicone spatulas and plastic spatulas according to their materials. In general, the silicone spatulas and the plastic spatulas are more suitable for coated pots. However, in order to maintain a certain structural strength, the shovel head of the silicone spatula or the plastic spatula is usually designed to be thicker, which causes inconvenience in use. On the other hand, although the shovel head of the metal spatula can be designed to be thinner, the metal spatula is not only easy to scratch the coating on the pot during the process of stir-frying ingredients, but also collides with the pot to produce noise. Therefore, the existing spatula cannot balance the structural strength, the thickness of the shovel head, and the convenience of use.

SUMMARY OF THE INVENTION

The present invention provides a spatula to improve the problems in the prior art.

In order to achieve at least one of the above advantages or other advantages, an embodiment of the present invention provides a spatula, which includes a shovel portion, a reinforcing piece, a shovel handle and a coating layer. The reinforcing piece is provided on the shovel portion. The shovel handle has a connecting end connected to the reinforcing piece. The coating layer coats the shovel portion and the reinforcing piece and extends to the connecting end.

In an embodiment of the present invention, the shovel portion includes a shovel piece, and the reinforcing piece is provided on the shovel piece and adjacent to an edge of the shovel piece.

In an embodiment of the present invention, the connecting end is formed with an insertion slot, and a part of the shovel piece overlapping with the reinforcing piece partially extends into the insertion slot.

In an embodiment of the present invention, a part of the shovel piece that does not overlap with the reinforcing piece partially extends into the insertion slot.

In an embodiment of the present invention, the shovel piece has a first side edge and a second side edge opposite to each other, the second side edge is arc-shaped, and the reinforcing piece is adjacent to an arc top of the second side edge.

In an embodiment of the present invention, the connecting end is formed with an insertion slot, the reinforcing piece has an insertion portion that does not overlap with the shovel piece, and the insertion portion extends into the insertion slot.

In an embodiment of the present invention, the connecting end further has two extension portions extending in different directions from the insertion slot, and the two extension portions extend along the edge of the shovel piece.

In an embodiment of the present invention, the shovel piece has two adjacent side edges, and the reinforcing piece is adjacent to a connection between the two side edges.

In an embodiment of the present invention, the coating layer further coats a part or the entire shovel handle.

In an embodiment of the present invention, the shovel piece further has a plurality of penetration holes.

In an embodiment of the present invention, the shovel portion is a metal shovel portion, the reinforcing piece is a metal reinforcing piece, the shovel handle is a plastic shovel handle or a wooden shovel handle, and the coating layer is a silicone coating layer or a rubber coating layer.

In an embodiment of the present invention, the shovel portion includes a ring frame. The coating layer coats the ring frame and a zone surrounded by the ring frame. A height of the ring frame is greater than a thickness of the shovel piece in a thickness direction of the shovel piece.

In an embodiment of the present invention, the shovel portion further includes a shovel piece, which is provided in a zone surrounded by the ring frame and connected to the ring frame. The coating layer also coats the shovel piece.

The spatula of the present invention adopts a reinforcing piece to strengthen the structural strength of the connection between the shovel portion and the shovel handle, and uses a coating layer to coat the shovel piece portion and the reinforcing piece to enhance the overall structural strength of the spatula. In this way, the spatula can still have good structural strength even when the total thickness of the coating layer coating the shovel portion and the shovel portion is reduced. In addition, the reducing of the thickness of the shovel portion and the coating layer also makes the spatula easier to use. In addition, the shovel portion of the present invention further has the advantage of smaller weight. Moreover, the weight distribution of the spatula will not be concentrated on the side of the shovel portion, so that the spatula can be easier to use in the process of stir-frying ingredients. Based on the above, the spatula of the present invention can solve the problems in the prior art.

The above description is only an overview of the technical solution of the present invention. In order to understand the technical means of the present invention more clearly, the invention can be implemented in accordance with the content of the specification. Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
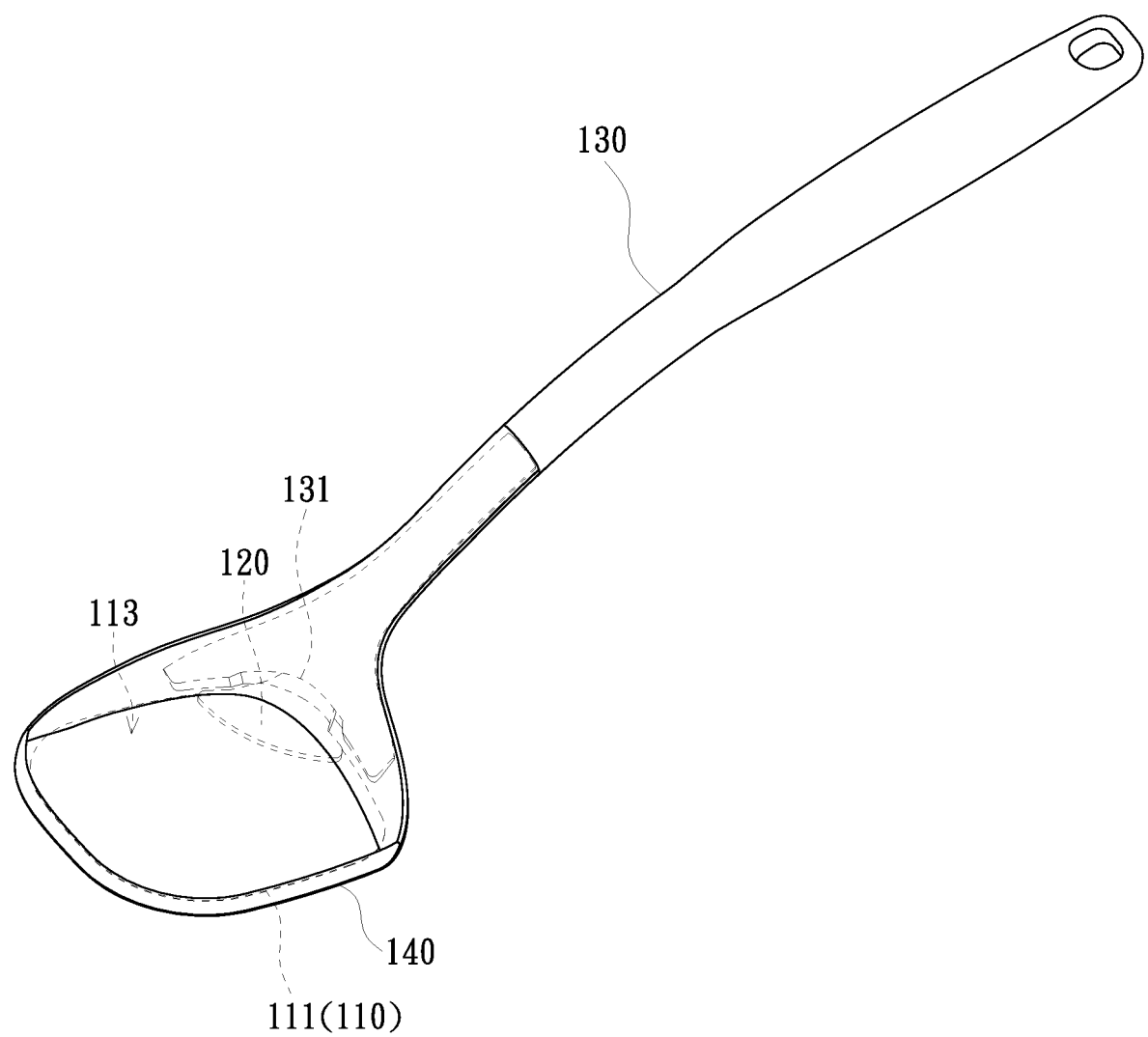
FIG. 1 is a three-dimensional schematic view of a spatula according to an embodiment of the present invention.

FIG. 1 is a three-dimensional schematic view of a spatula according to an embodiment of the present invention. Please refer to FIG. 1. The spatula 100 includes a shovel portion 110, a reinforcing piece 120, a shovel handle 130 and a coating layer 140. The reinforcing piece 120 is provided on the shovel portion 110. The shovel handle 130 has a connecting end 131 connected to the reinforcing piece 120. The coating layer 140 coats the shovel portion 110 and the reinforcing piece 120 and extends to the connecting end 131. Specifically, the shovel portion 110 may include a shovel piece 111. The reinforcing piece 120 is provided on the shovel piece 111 and adjacent to the edge of the shovel piece 111. The reinforcing piece 120 of this embodiment is provided on the shovel surface 113 of the shovel piece 111. In another embodiment, the reinforcing piece 120 may be provided on the bottom surface (not labeled) opposite to the shovel surface 113.

Figure 2A:
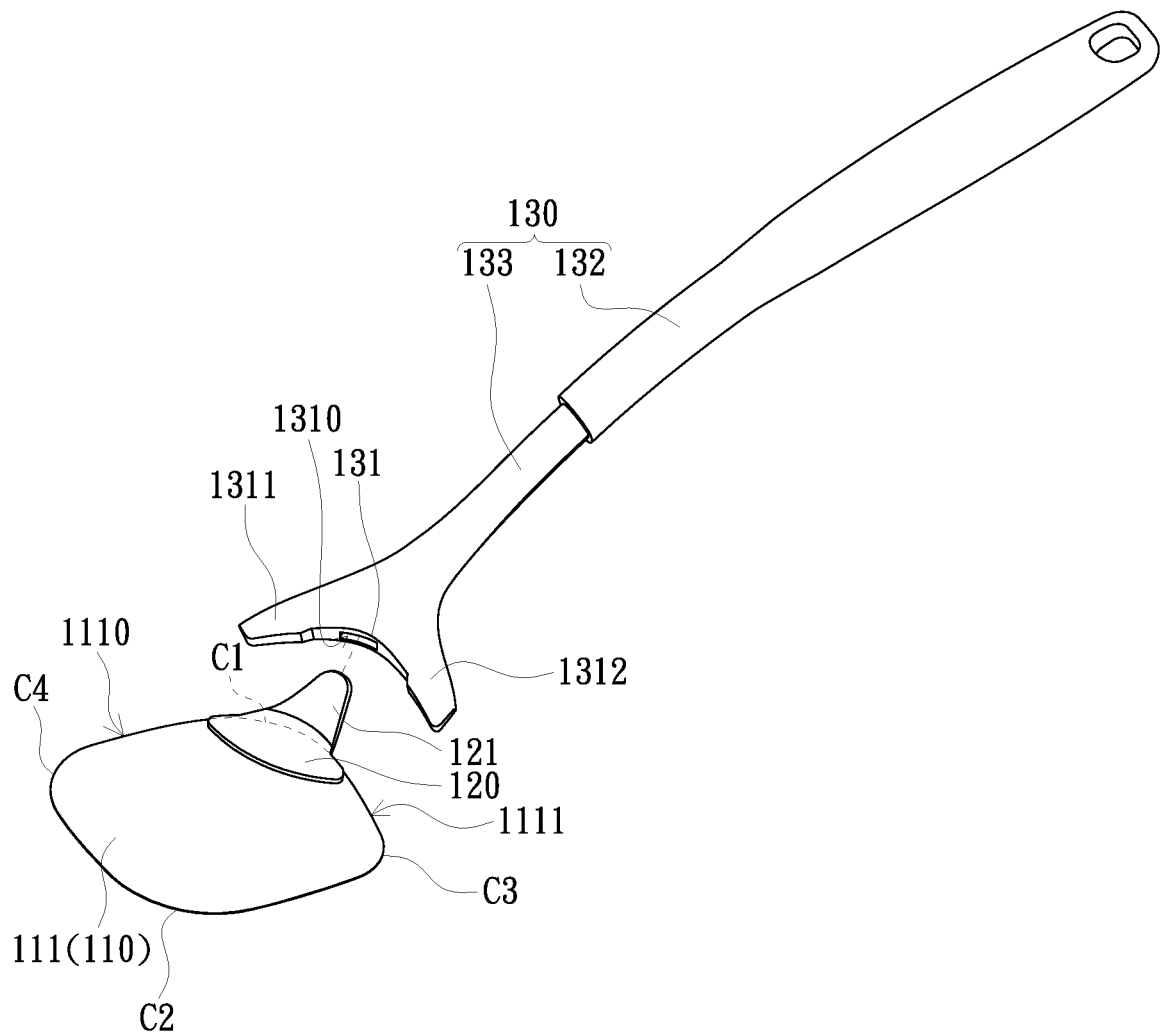
FIG. 2A is an exploded schematic view of the spatula of FIG. 1 without showing the coating layer.
Figure 2B:
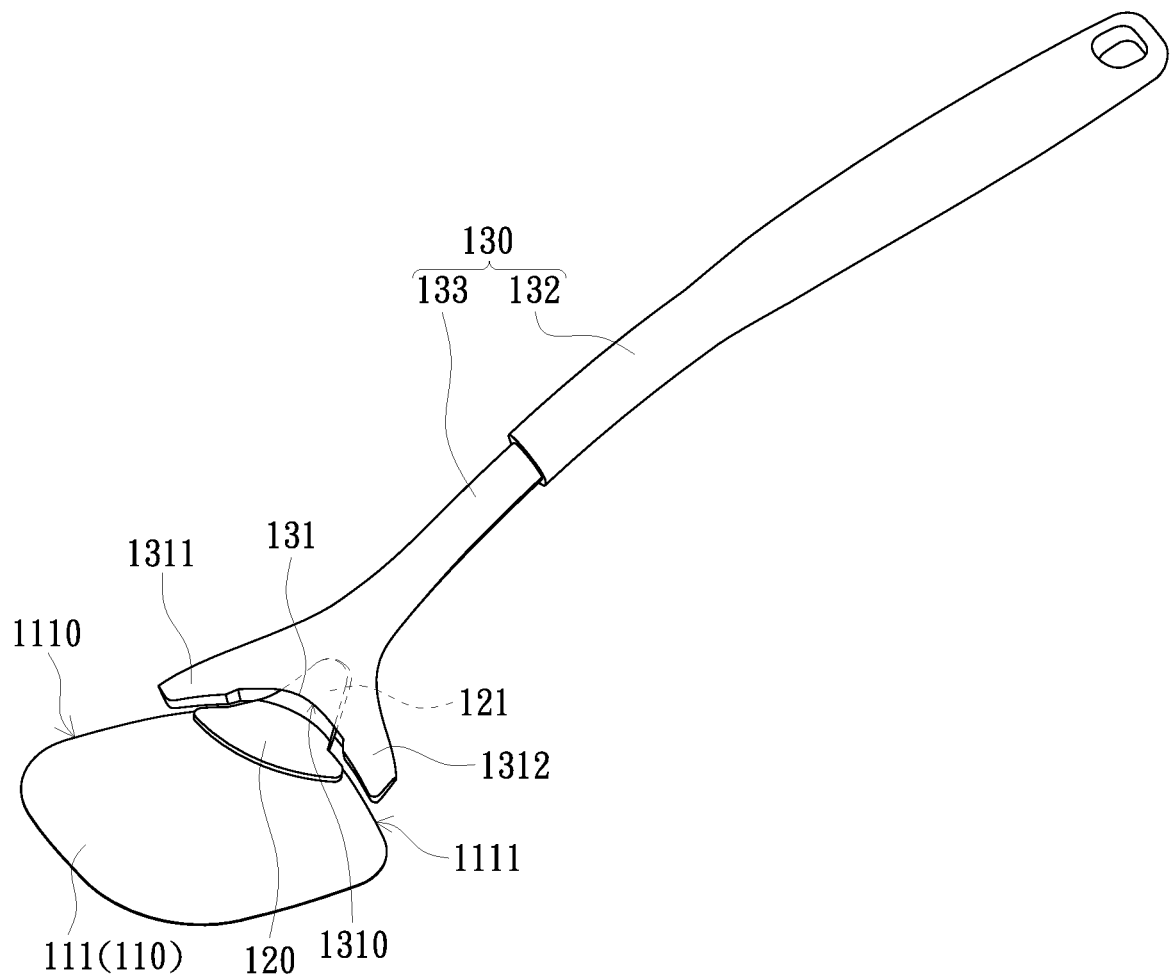
FIG. 2B is an assembly schematic view of the spatula of FIG. 2A.

FIG. 2A is an exploded schematic view of the spatula of FIG. 1 without showing the coating layer. FIG. 2B is an assembly schematic view of the spatula of FIG. 2A. Please refer to FIGS. 2A and 2B. The shovel piece 111 of this embodiment may have two side edges 1110 and 1111 adjacent to each other. The reinforcing piece 120 is adjacent to the connection between the two side edges 1110 and 1111. Specifically, as shown in FIG. 2A, the shovel piece 111 may have four corners C1, C2, C3 and C4. The corner C1 is located, for example, at the connection between the two side edges 1110 and 1111, and the reinforcing piece 120 is located at the corner C1. The corner C2 is opposite to the corner C1, and the corner C3 is opposite to the corner C4. The corners C1, C2, C3 and C4 of this embodiment are round corners, but are not limited thereto.

The shovel portion 110 of this embodiment may be a metal shovel portion. For example, the shovel portion 110 may be an elastic metal shovel portion, such as an elastic steel shovel portion or an elastic stainless steel shovel portion, but the invention is not limited thereto. Based on the above structure, the weight of the shovel portion 110 of this embodiment can be reduced, so that the weight distribution of the spatula 100 of this embodiment is not concentrated on the side of the shovel portion 110. In this way, the spatula 100 is easier to use in the process of stir-frying ingredients.

Figure 3:
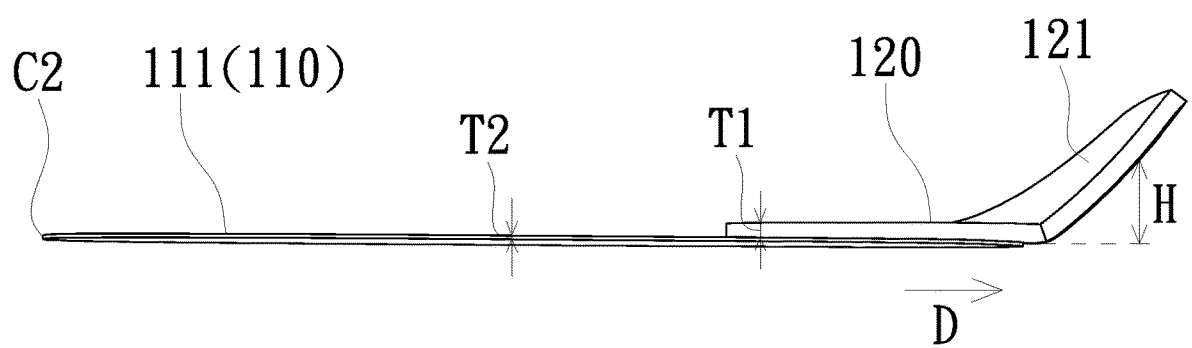
FIG. 3 is a schematic side view of the shovel piece and the reinforcing piece in FIG. 2A.

The reinforcing piece 120 can be integrally formed with the shovel piece 111. For example, the reinforcing piece 120 may be formed together with the shovel piece 111 during the die-casting of the shovel piece 111, or the shovel piece 111 may be bent to form the reinforcing piece 120 on the shovel piece 111. In another embodiment, the reinforcing piece 120 may be an independent element additionally provided on the shovel piece 111 instead of being integrally formed with the shovel piece 111. For example, the reinforcing piece 120 may be fixed to the shovel piece 111 by welding after being separately formed, and the aforementioned welding includes, for example, burn-in welding or butt welding, but the present invention is not limited thereto. In addition, the reinforcing piece 120 of this embodiment may be a metal reinforcing piece, such as a stainless steel reinforcing piece, but is not limited thereto. Please refer to FIG. 3. The thickness T1 of the reinforcing piece 120 may be greater than the thickness T2 of the shovel sheet 111. For example, the thickness T2 of the shovel sheet 111 may be between 0.18 mm and 0.5 mm, for example, about 0.3 mm, and the thickness T1 of the reinforcing piece 120 may be between 0.8 mm and 2.3 mm Other features of the reinforcing piece 120 will be described below together with the connecting end 131 of the shovel handle 130.

Figure 4:
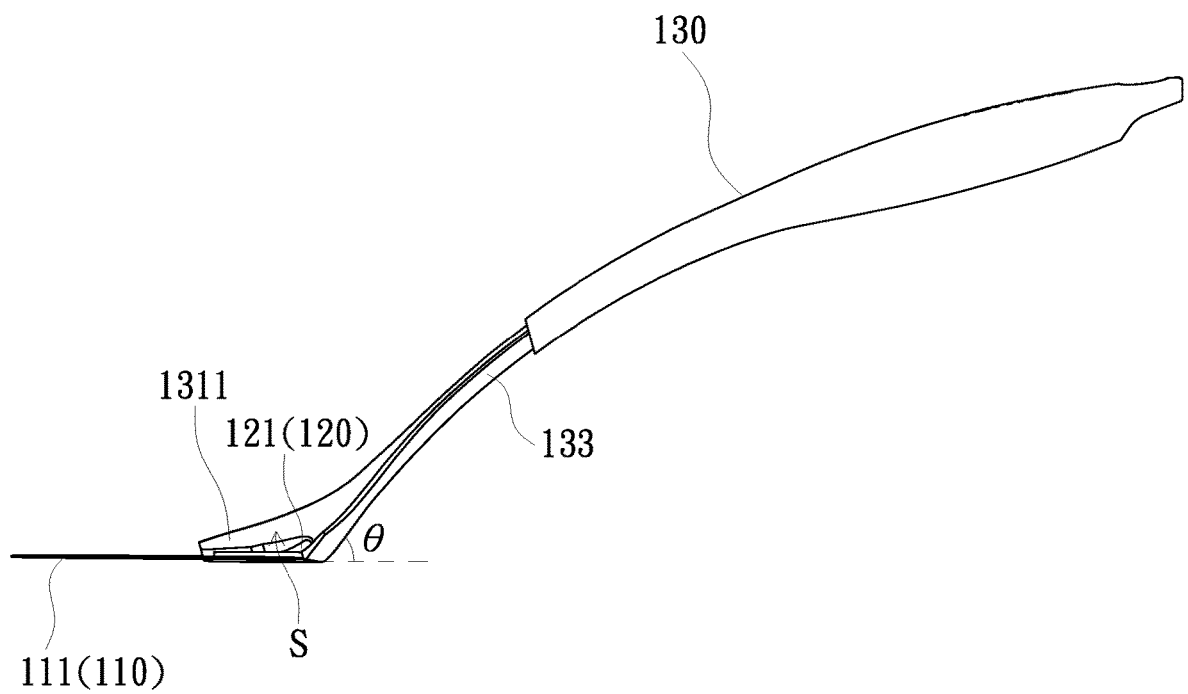
FIG. 4 is a schematic side view of the spatula of FIG. 2B.

Please refer to FIGS. 2A and 2B again. The connecting end 131 of the shovel handle 130 may be formed with an insertion slot 1310. The reinforcing piece 120 may have an insertion portion 121 that does not overlap the shovel piece 111. The insertion portion 121 extends, for example, into the insertion slot 1310 to improve the overall structural strength of the spatula 100. The connecting end 131 of the shovel handle 130 of this embodiment can be formed with the insertion slot 1310 fixed to the insertion portion 121 by means of injection, high-frequency welding, hot melting, insertion or gluing, but the present invention does not limit the formation of the insertion slot 1310. Please refer to FIG. 3 again. The insertion portion 121 extends, for example, in the direction D away from the corner C2 of the shovel piece 111 and is bent upward, so that the vertical distance H between the insertion portion 121 and the shovel piece 111 gradually increases in the direction D. Thus, as shown in FIG. 4, there is a predetermined angle θ between the handle body 133 of the shovel handle 130 and the shovel piece 111 after the insertion slot 1310 (shown in FIG. 2A) of the shovel handle 130 is engaged with the insertion portion 121, thereby facilitating the user to use. The predetermined angle θ can be changed according to actual needs, and the specific value of the predetermined angle θ is not limited in this embodiment.

Please refer to FIGS. 2A and 2B again. The connecting end 131 of this embodiment may further have two extension portions 1311 and 1312 extending in different directions from the insertion slot 1310, and the two extension portions 1311 and 1312 extend along the edge of the shovel piece 111. Specifically, the extension portion 1311 extends, for example, along the side edge 1110 of the shovel piece 111 but does not reach the corner C4 (labeled in FIG. 2A), and the extension portion 1312 extends, for example, along the side edge 1111 of the shovel piece 111 but does not reach the corner C3 (labeled in FIG. 2A). Please refer to FIG. 4 again. The extension portion 1311 may have a blocking surface S rising in a direction away from the shovel piece 111. The blocking surface S may be an inclined surface or an arc surface. Similarly, the extension portion 1312 may also have a blocking surface (not shown). In this way, the extension portions 1311 and 1312 can block the ingredients during the process of stir-frying ingredients, so as to prevent the ingredients from leaking from the side of the shovel piece 111 close to the shovel handle 130.

Please refer to FIGS. 2A and 2B again. In general, the shovel handle 130 may have a grip 132 and a handle body 133. The connecting end 131 is, for example, located at the end of the handle body 133. The grip 132 can be connected to the end of the handle body 133 away from the connecting end 131 and has a shape suitable for the user to hold. In addition, the shovel handle 130 of this embodiment can be a plastic shovel handle or a wooden shovel handle. Specifically, the grip 132 of this embodiment can be a plastic grip, and the handle body 133 can also be a plastic handle body, but the invention is not limited thereto. For example, for the shovel handle 130 of other embodiments, only the grip 132 may be selected as a plastic grip, or only the handle body 133 may be selected as a plastic handle body. The shovel handle 130 of this embodiment is, for example, a nylon shovel handle, that is, the grip 132 may be a nylon grip and the handle body 133 may also be a nylon handle body, but the invention is not limited thereto. Thus, the spatula 100 also has the advantage of small weight, which makes the spatula 100 easier to use.

Please refer to FIG. 1 again. The coating layer 140 can be a silicone coating layer or a rubber coating layer. Therefore, the spatula 100 of this embodiment is not easy to scratch the coating on the pot and can also reduce the noise caused by collision with the pot. Incidentally, the coating layer 140 of this embodiment can further coat, for example, a part of the shovel handle 130. For example, the coating layer 140 may further extend and coat the handle body 133 (labeled in FIGS. 2A and 2B), but is not limited thereto. In addition, the total thickness of the coating layer 140 is approximately 1.8 mm to 3 mm. Because the shovel piece 111 is provided in the coating layer 140, the total thickness of the shovel piece 111 and the coating layer 140 in this embodiment can be less than 2 mm.

Compared with the prior art, the spatula 100 of this embodiment adopts a reinforcing piece 120 to strengthen the structural strength of the connection between the shovel piece 111 and the shovel handle 130, and uses a coating layer 140 to coat the shovel piece 111 and the reinforcing piece 120 to enhance the overall structural strength of the spatula 100. In this way, the spatula 100 can still have good structural strength even when the total thickness of the coating layer 140 coating the shovel piece 111 and the shovel piece 111 is reduced. In addition, the reducing of the thickness of the shovel piece 111 and the coating layer 140 also makes the spatula 100 easier to use. Incidentally, the shovel piece 111 of this embodiment may be an elastic metal shovel piece, such as an elastic steel shovel piece or an elastic stainless steel shovel piece. Therefore, the shovel piece 111 of this embodiment further has the advantage of smaller weight. Moreover, the weight distribution of the spatula 100 will not be concentrated on the side of the shovel piece 111, so that the spatula 100 can be easier to use in the process of stir-frying ingredients. Based on the above, the spatula 100 of the present embodiment can solve the problems in the prior art.

Figure 5:
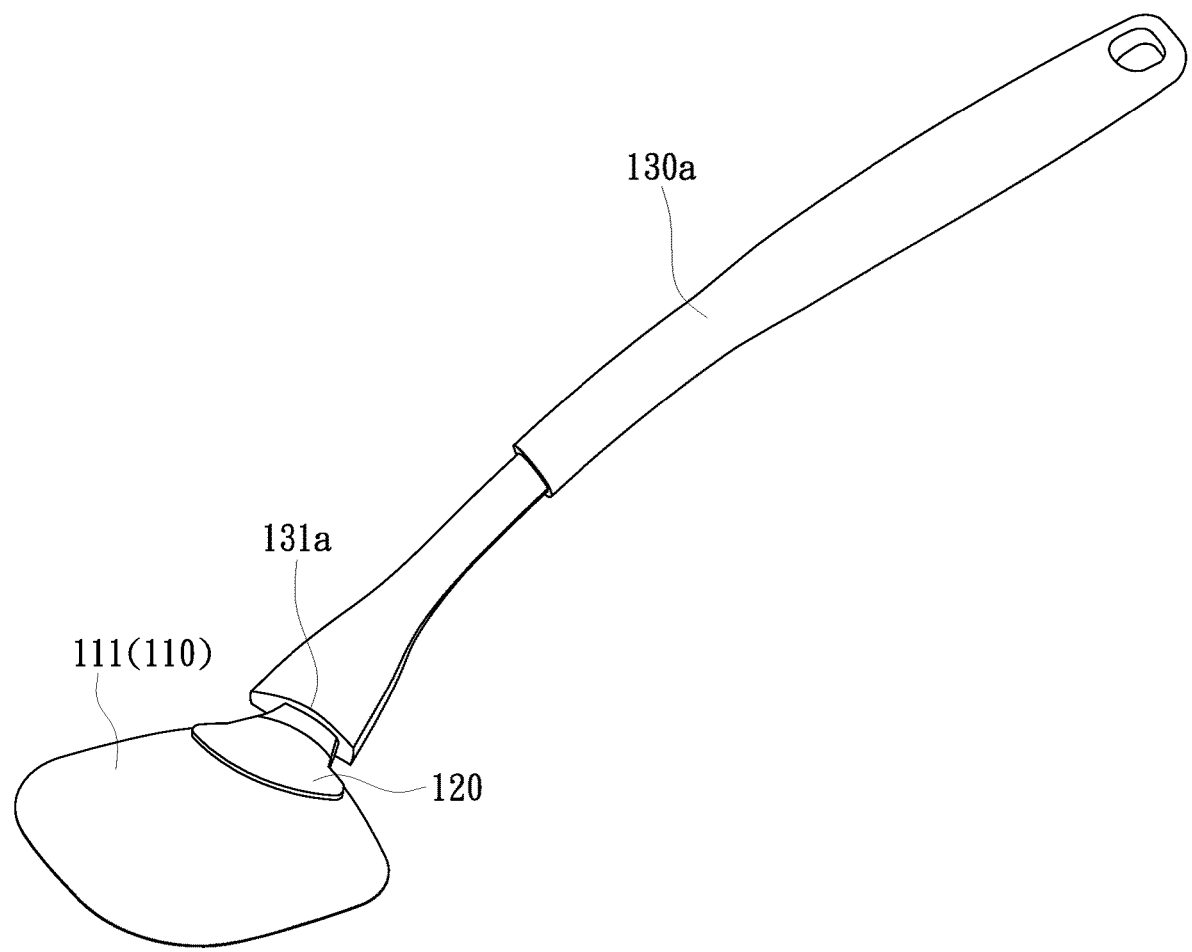
FIG. 5 is a three-dimensional schematic view of a spatula according to another embodiment of the present invention without showing the coating layer.

FIG. 5 is a three-dimensional schematic view of a spatula according to another embodiment of the present invention without showing the coating layer. The coating layer in FIG. 5 can be provided in a manner similar to the coating layer 140 in FIG. 1, but is not limited thereto. The structure and advantages of the spatula 100a of this embodiment are similar to those of the spatula 100 of FIG. 2B. The main difference is that the connecting end 131a of the shovel handle 130a of this embodiment is not provided with the extension portions 1311 and 1312 in FIG. 2B. Therefore, the spatula 100a of this embodiment further has the advantage of simple structure. The features of the shovel piece 111 of the shovel portion 110 of this embodiment are similar to those in the foregoing embodiments, and no redundant detail is to be given herein.

Figure 6A:
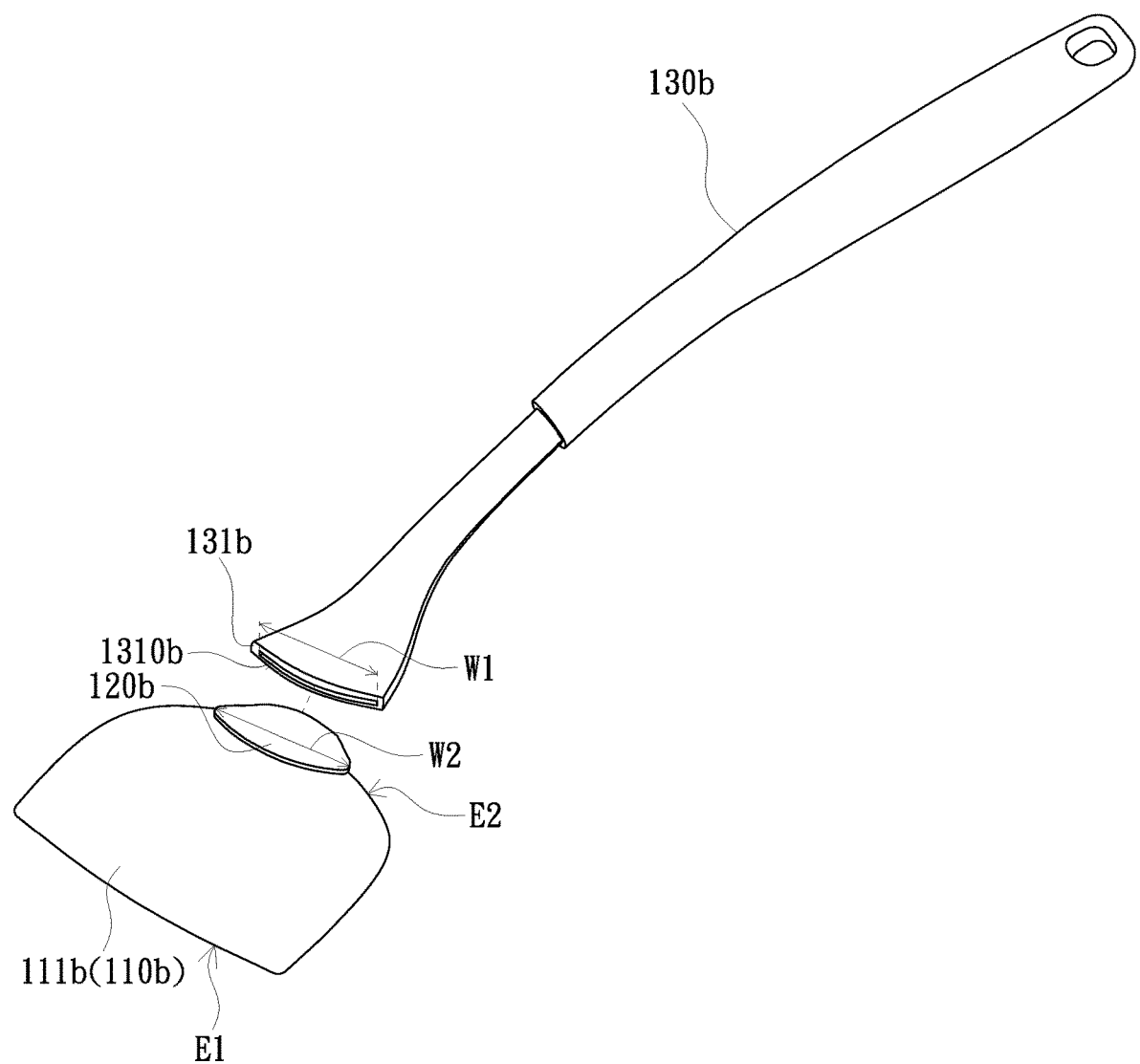
FIG. 6A is an exploded schematic view of a spatula according to another embodiment of the present invention without showing the coating layer.
Figure 6B:
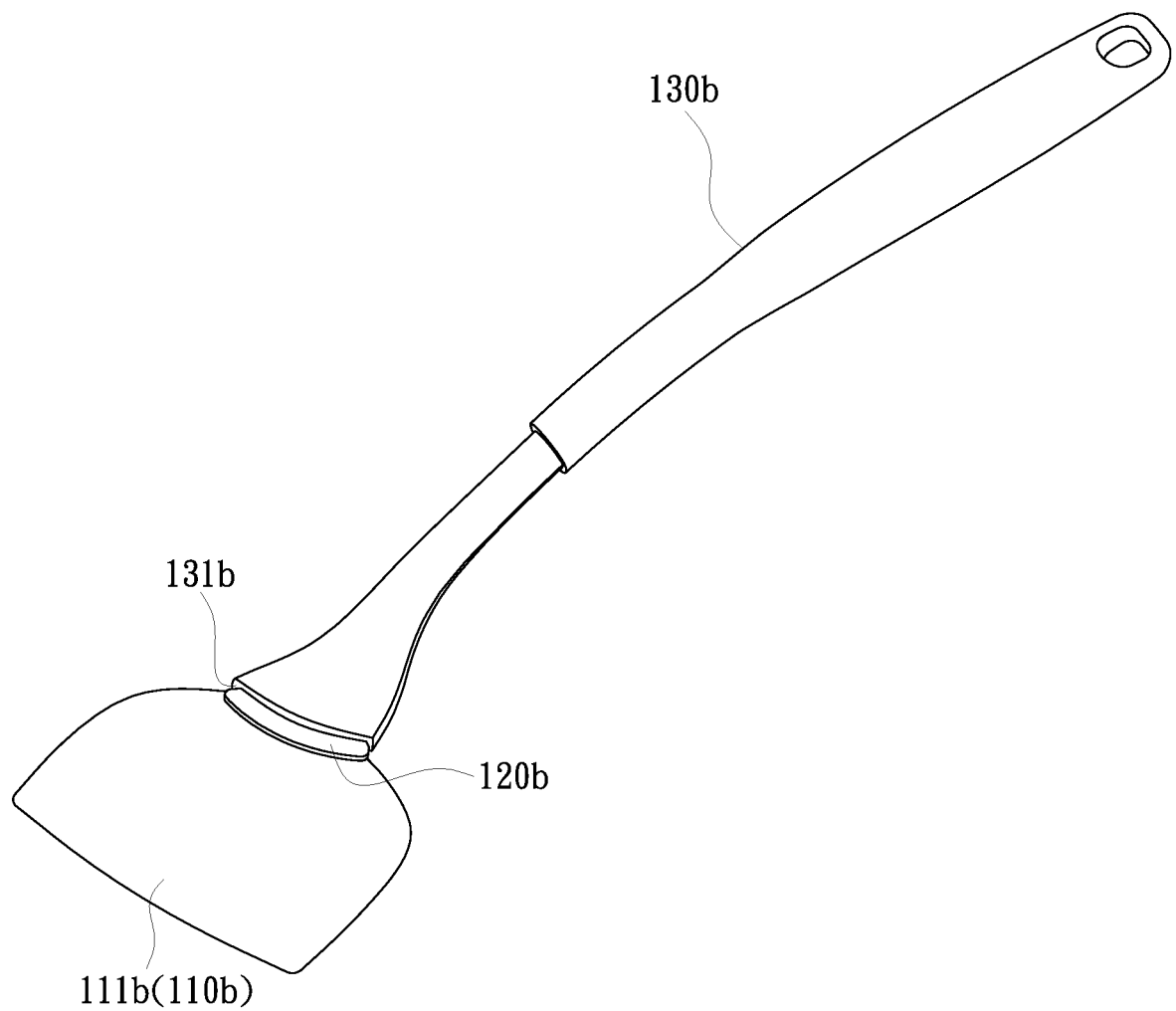
FIG. 6B is an assembly schematic view of the spatula of FIG. 6A.

FIG. 6A is an exploded schematic view of a spatula according to another embodiment of the present invention without showing the coating layer. FIG. 6B is an assembly schematic view of the spatula of FIG. 6A. The coating layer in FIGS. 6A and 6B can be provided similarly to the coating layer 140 in FIG. 1, but is not limited thereto. The structure and advantages of the spatula 100b of this embodiment are similar to those of the spatula 100 of FIG. 2B, and only the differences will be described below. Please refer to FIGS. 6A and 6B. The reinforcing piece 120b of this embodiment is not provided with the insertion portion 121 in FIG. 2B, and the part of the shovel piece 111b of the shovel portion 110b overlapping with the reinforcing piece 120b partially extends into the insertion slot 1310b of the connecting end 131b. Specifically, as shown in FIG. 6A, the insertion slot 1310b may have a width W1 in the longitudinal direction, and the reinforcing piece 120b may have a maximum width W2 in the longitudinal direction, wherein the maximum width W2 of the reinforcing piece 120b can be greater than the width W1 of the insertion slot 1310b. Thus, the overlapping part of the reinforcing piece 120b and the shovel piece 111b can partially extend into the insertion slot 1310b and abut against the inner side wall (not shown) of the insertion slot 1310b, so that the reinforcing piece 120b can be fixed in the insertion slot 1310b. In addition, the shovel piece 111b of this embodiment may further have a first side edge E1 and a second side edge E2 opposite to each other. The second side edge E2 is arc-shaped. The reinforcing piece 120b is adjacent to the arc top of the second side edge E2. Specifically, the first side edge E1 can be located on the side of the shovel piece 111b away from the shovel handle 130b, and can be used as the front edge of the shovel piece 111b. The first side edge E1 of this embodiment is, for example, an arc with a curvature smaller than that of the second side edge E2, but is not limited thereto.

Figure 7A:
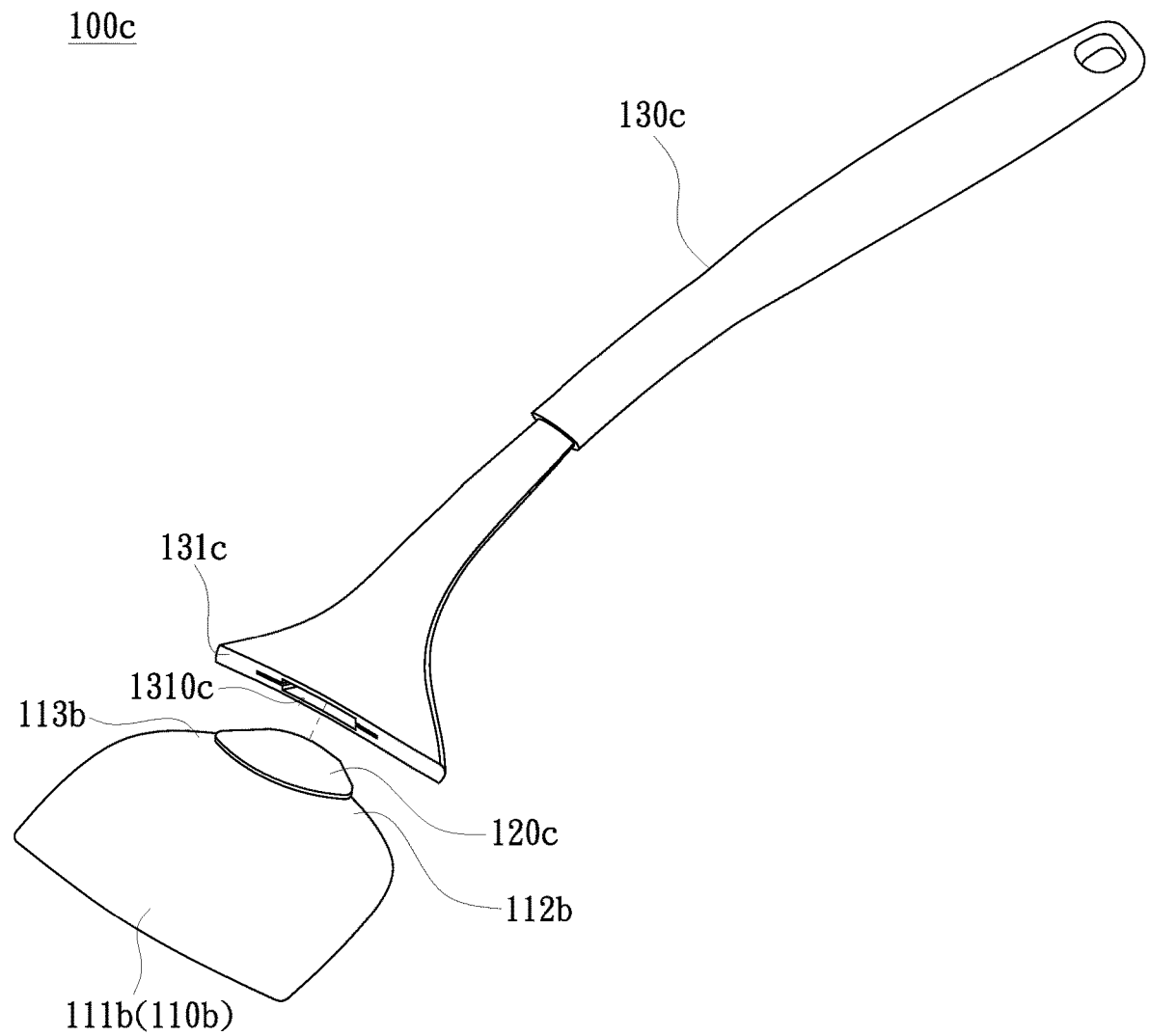
FIG. 7A is an exploded schematic view of a spatula according to another embodiment of the present invention without showing the coating layer.
Figure 7B:
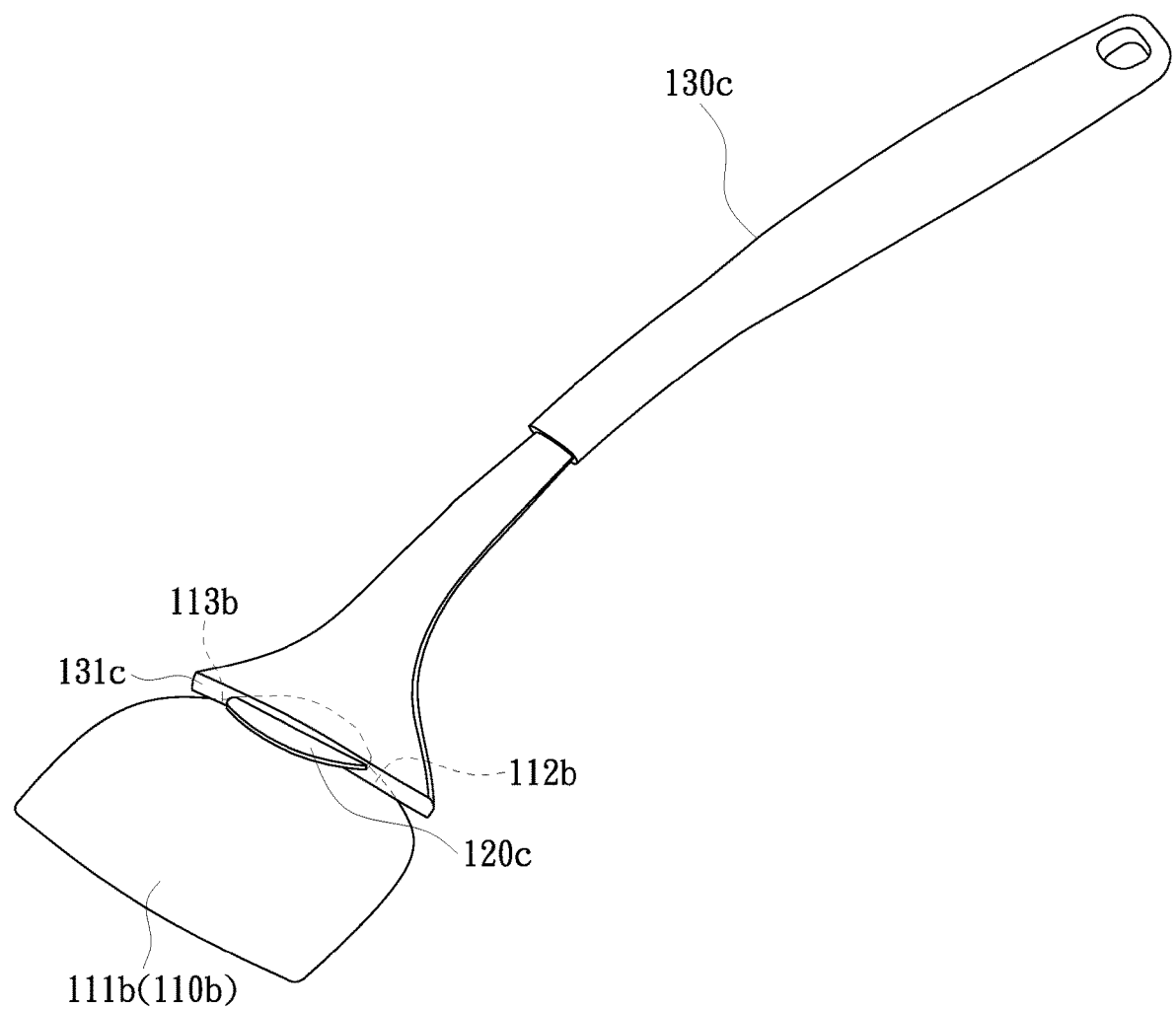
FIG. 7B is an assembly schematic view of the spatula of FIG. 7A.

FIG. 7A is an exploded schematic view of a spatula according to another embodiment of the present invention without showing the coating layer. FIG. 7B is an assembly schematic view of the spatula of FIG. 7A. The coating layer in FIGS. 7A and 7B can be provided similarly to the coating layer 140 in FIG. 1, but is not limited thereto. The structure and advantages of the spatula 100c of this embodiment are similar to those of the spatula 100b of FIG. 6B, and only the differences will be described below. Please refer to FIGS. 7A and 7B. In addition to the part of the shovel piece 111b overlapping with the reinforcing piece 120c, the part of the shovel piece 111b of this embodiment that does not overlap the reinforcing piece 120c can also partially extend into the insertion slot 1310c. For example, the portions 112b and 113b of the shovel piece 111b located on both sides of the reinforcing piece 120c can extend into the insertion slot 1310c. In this way, the reinforcing piece 120c and the shovel piece 111b can be more firmly connected to the connecting end 131c of the shovel handle 130c.

Figure 8:
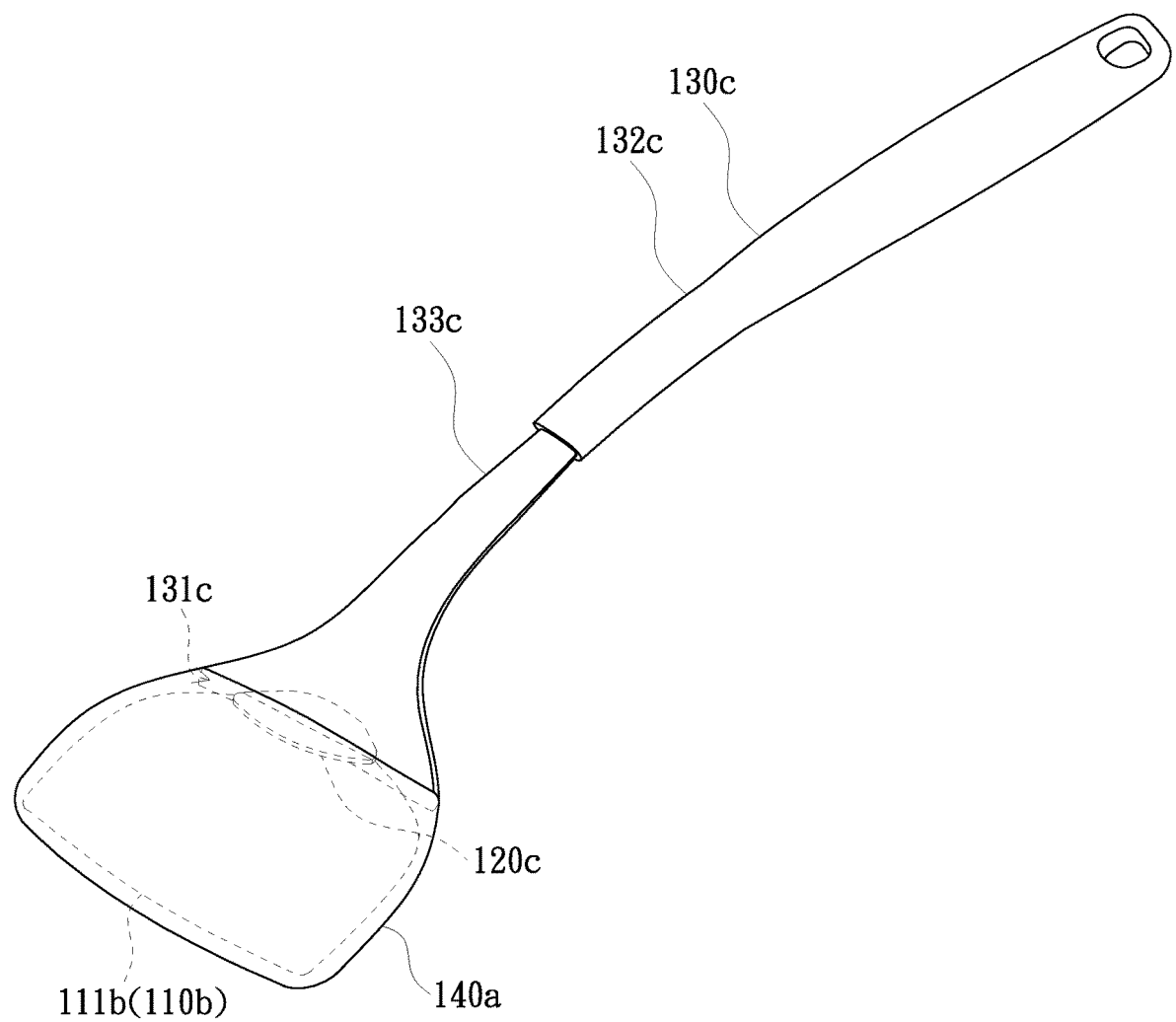
FIG. 8 is a three-dimensional schematic view of a spatula according to another embodiment of the present invention.

FIG. 8 is a three-dimensional schematic view of a spatula according to another embodiment of the present invention. The structure and advantages of the spatula 100d of this embodiment are similar to those of the spatula 100c of FIG. 7B. The main difference is that the coating layer 140a of this embodiment coats the shovel piece 111b and the reinforcing piece 120c and extends to the connecting end 131c, but does not coat the handle body 133c of the shovel handle 130c. It should be noted that the spatulas 100, 100a, 100b, 100c and 100f of other embodiments can be provided with the coating layer 140a of this embodiment. Incidentally, in FIG. 8, there is no segment difference between the handle body 133c and the grip 132c of the shovel handle 130c. In addition, the shape of the shovel portion 110b shown in FIG. 8 is only an example, and the invention is not limited thereto.

Figure 9:
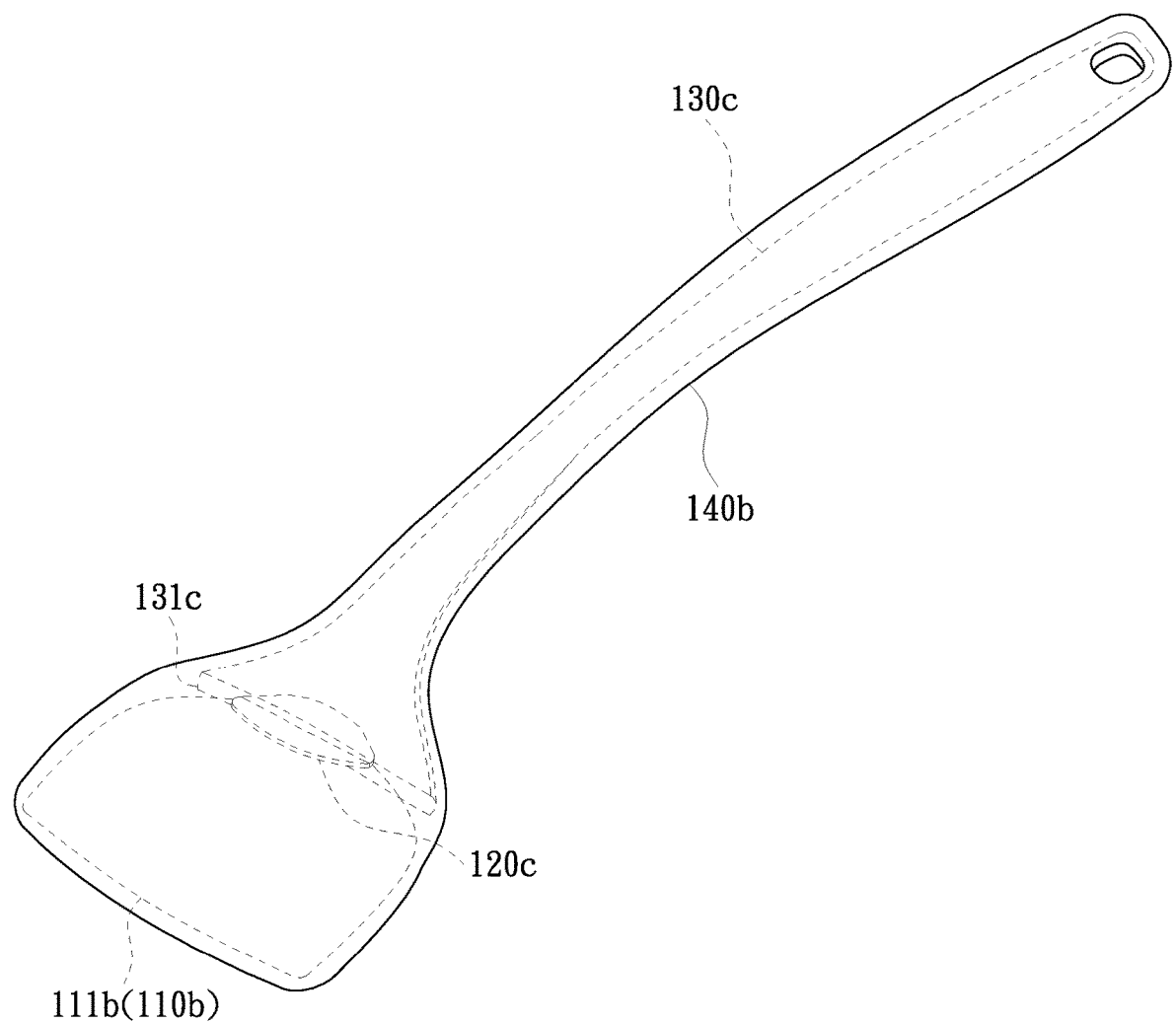
FIG. 9 is a three-dimensional schematic view of a spatula according to another embodiment of the present invention.

FIG. 9 is a three-dimensional schematic view of a spatula according to another embodiment of the present invention. Please refer to FIG. 9, which is different from the embodiment of FIG. 7B in that the coating layer 140b of the spatula 100e of this embodiment can also coat all of the shovel handle 130c. In other words, the coating layer 140b of this embodiment coats the entire spatula 100e. Incidentally, in FIG. 9, the shovel handle 130c may have a segment difference as shown in FIG. 8. It can be understood that the entire shovel handle 130 in FIG. 2B, the entire shovel handle 130a in FIG. 5, the entire shovel handle 130b in FIG. 6B, and the entire shovel handle 130c in FIG. 10 can be coated by the coating layer 140b of this embodiment. The features of the shovel piece 111b of the shovel portion 110b are similar to those in the embodiment of FIG. 6A, and no redundant detail is to be given herein.

Figure 10:
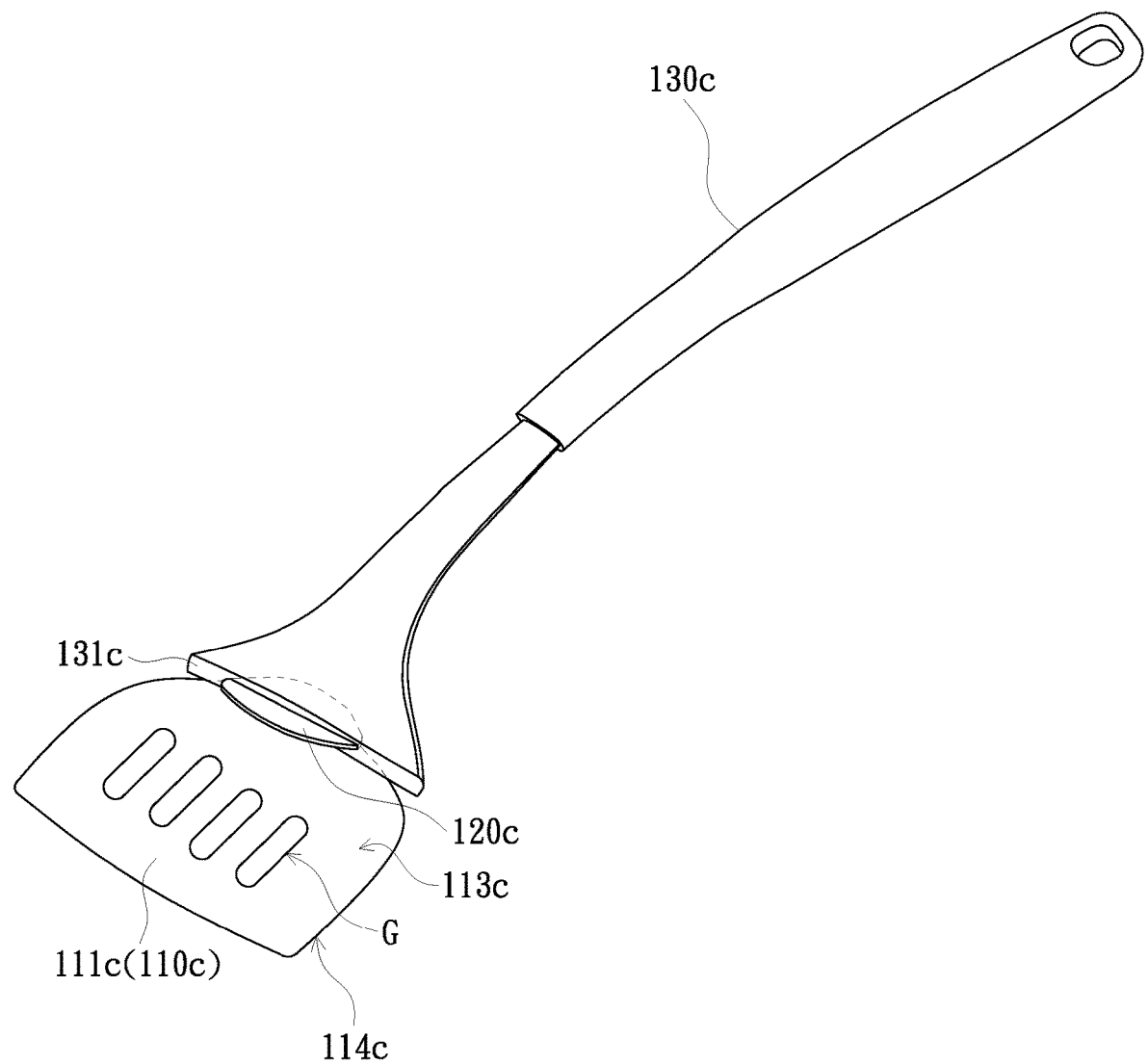
FIG. 10 is a three-dimensional schematic view of a spatula according to another embodiment of the present invention without showing the coating layer.

FIG. 10 is a three-dimensional schematic view of a spatula according to another embodiment of the present invention without showing the coating layer. The coating layer in FIG. 10 can be provided similarly to the coating layer 140 in FIG. 1, but is not limited thereto. In addition, the shovel piece 111c of the shovel portion 110c of this embodiment may further have a plurality of penetration holes G. Specifically, the shovel piece 111c has a shovel surface 113c and a bottom surface 114c opposite to each other. The penetration hole G penetrates, for example, the bottom surface 114c and the shovel surface 113c. In detail, the shovel piece 111c may be uneven due to stress during the process of mounting the reinforcing piece 120c to the shovel piece 111c, such as die-casting, bending or welding described above. Therefore, the penetration holes G can reduce the generation of stress, so as to improve the unevenness of the shovel piece 111c. Incidentally, the features such as the number, shape and arrangement of the penetration holes G shown in FIG. 10 are only examples, and the present embodiment does not limit the details of the penetration holes G.

Figure 11A:
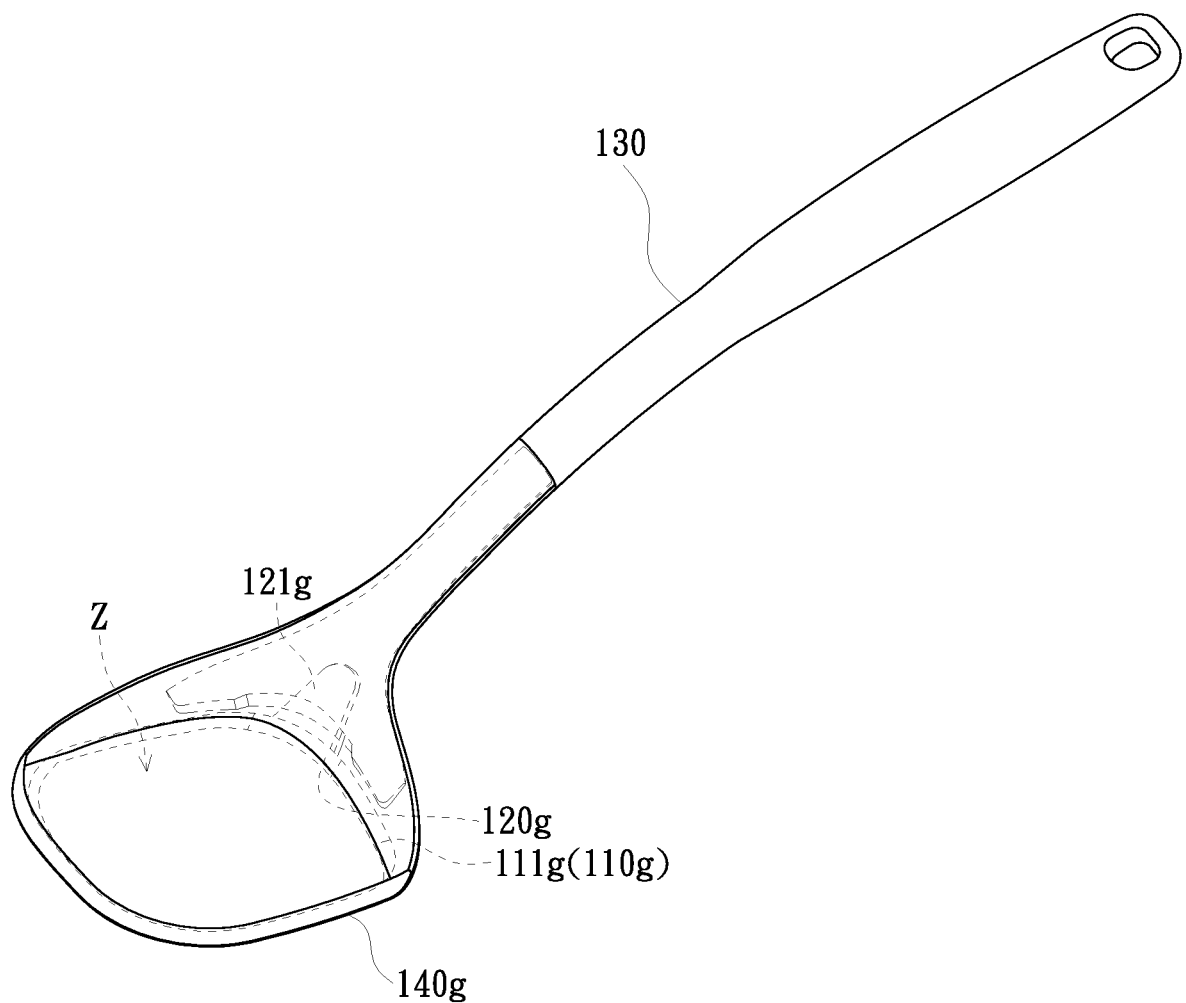
FIG. 11A is a three-dimensional schematic view of a spatula according to another embodiment of the present invention.
Figure 11B:
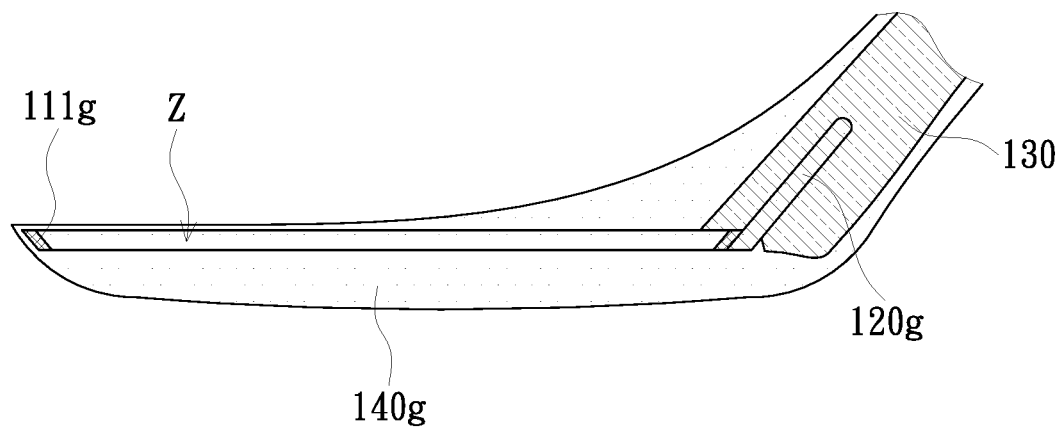
FIG. 11B is a schematic partial cross-sectional view of the spatula of FIG. 11A.

FIG. 11A is a three-dimensional schematic view of a spatula according to another embodiment of the present invention. FIG. 11B is a schematic partial cross-sectional view of the spatula of FIG. 11A. Please refer to FIGS. 11A and 11B. Different from the embodiment of FIG. 1, the shovel portion 110g of the spatula 100g of this embodiment may include a ring frame 111g. The coating layer 140g coats the ring frame 111g and the zone Z surrounded by the ring frame 111g. Specifically, the ring frame 111g is, for example, a metal ring frame and can be formed by cutting and welding, but is not limited thereto. In an embodiment, the ring frame 111g can be formed by stamping. In another embodiment, the ring frame 111g and the reinforcing piece 120g may be integrally formed, and the specific forming process is similar to those described above. In this embodiment, the reinforcing piece 120g is, for example, connected to the part of the ring frame 111g located outside the zone Z. The reinforcing piece 120g can be connected to the ring frame 111g by welding, but is not limited thereto.

Figure 12A:
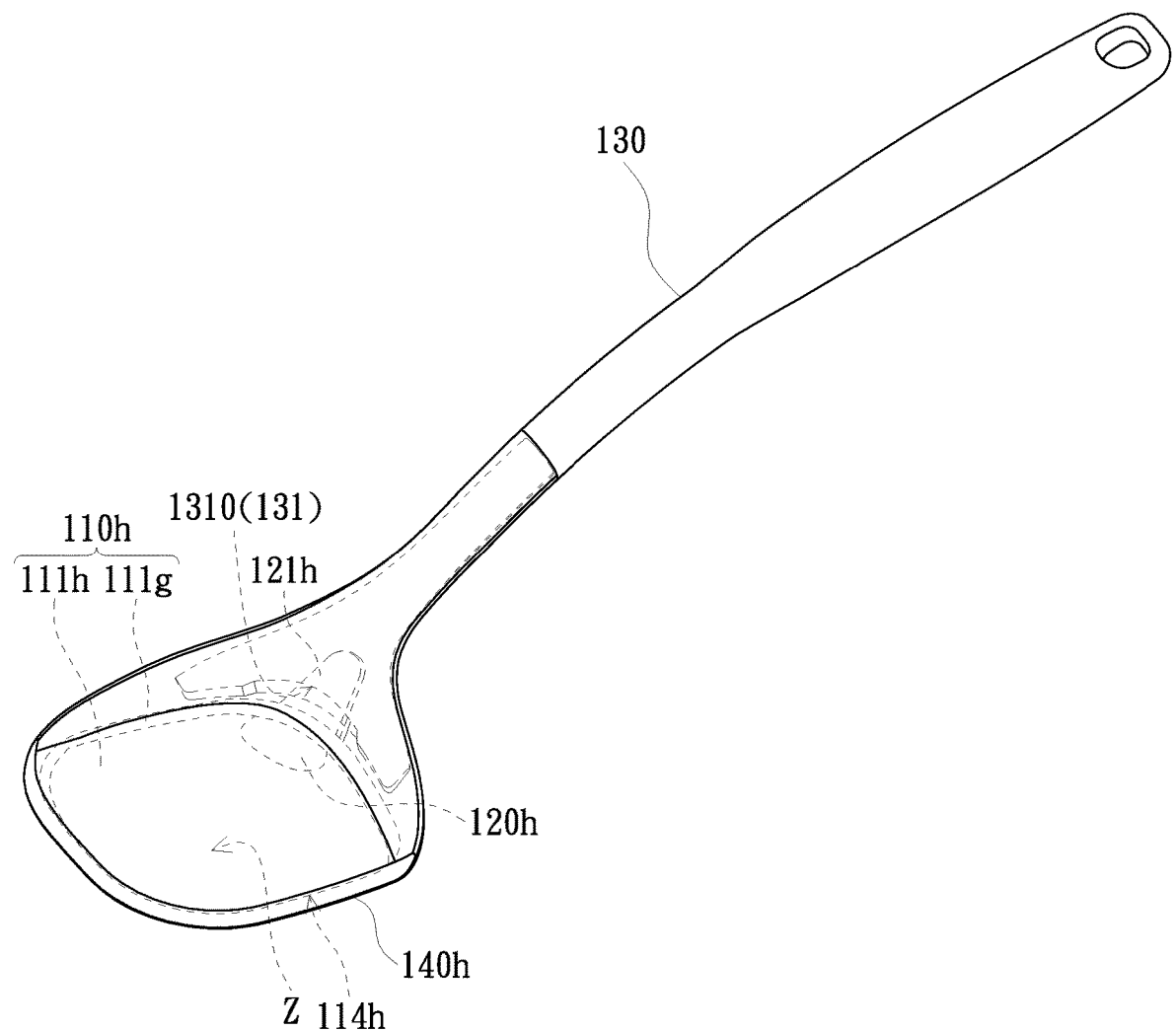
FIG. 12A is a three-dimensional schematic view of a spatula according to another embodiment of the present invention.
Figure 12B:
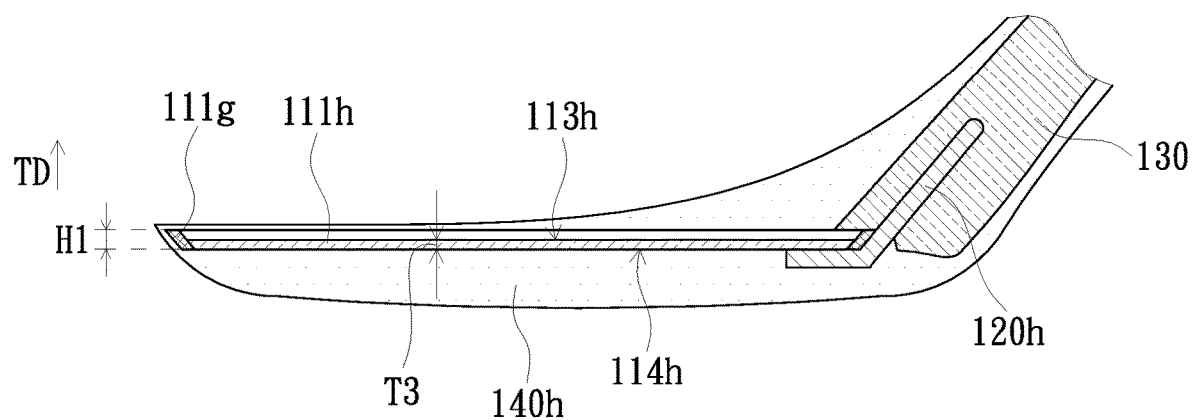
FIG. 12B is a schematic partial cross-sectional view of the spatula of FIG. 12A.

FIG. 12A is a three-dimensional schematic view of a spatula according to another embodiment of the present invention. FIG. 12B is a schematic partial cross-sectional view of the spatula of FIG. 12A. Please refer to FIGS. 12A and 12B. Compared with the embodiment of FIG. 11A, the shovel portion 110h of the spatula 100h of this embodiment may further include a shovel piece 111h. The shovel piece 111h is provided in the zone Z surrounded by the ring frame 111g and is connected to the ring frame 111g. The coating layer 140h also coats the shovel piece 111h. Similarly, the shovel piece 111h can be connected to the ring frame 111g in the manner described above, or can be integrally formed with the ring frame 111g. The reinforcing piece 120h of this embodiment can be connected to the bottom surface 114h of the shovel piece 111h. In addition, as shown in FIG. 12B, the height H1 of the ring frame 111g may be greater than the thickness T3 of the shovel piece 111h in the thickness direction TD of the shovel piece 111h. Specifically, the thickness direction TD is, for example, from the bottom surface 114h to the shovel surface 113h of the shovel piece 111h. In other words, one side of the ring frame 111g of this embodiment can protrude from the shovel surface 113h.

Incidentally, similar to the embodiment of FIG. 1, the connecting end 131 of the shovel handle 130 in the embodiment of FIG. 12A may be formed with an insertion slot 1310. The reinforcing piece 120h may have an insertion portion 121h that does not overlap the shovel portion 110h, and the insertion portion 121h extends, for example, into the insertion slot 1310. Similarly, the detailed structures of the reinforcing piece 120g, the insertion portion 121g and the shovel handle 130 in FIG. 11A are also the same as those in the embodiment of FIG. 1. Because the detailed structure of the above components has been described in the embodiment of FIG. 1, no redundant detail is to be given herein.

In summary, the spatula of the present invention adopts a reinforcing piece to strengthen the structural strength of the connection between the shovel portion and the shovel handle, and uses a coating layer to coat the shovel piece portion and the reinforcing piece to enhance the overall structural strength of the spatula. In this way, the spatula can still have good structural strength even when the total thickness of the coating layer coating the shovel portion and the shovel portion is reduced. In addition, the reducing of the thickness of the shovel portion and the coating layer also makes the spatula easier to use. In addition, the shovel portion of the present invention further has the advantage of smaller weight. Moreover, the weight distribution of the spatula will not be concentrated on the side of the shovel portion, so that the spatula can be easier to use in the process of stir-frying ingredients. Based on the above, the spatula of the present invention can solve the problems in the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A spatula, comprising:
a shovel portion;
a reinforcing piece, provided on the shovel portion;
a shovel handle, having a connecting end connected to the reinforcing piece; and
a coating layer, coating the shovel portion and the reinforcing piece and extending to the connecting end,
wherein the shovel portion comprises a shovel piece, the reinforcing piece is provided on the shovel piece and adjacent to an edge of the shovel piece, a part of a shovel surface or a part of a bottom surface of the shovel piece overlaps the reinforcing piece, and a center of the shovel surface does not overlap the reinforcing piece.

2. The spatula according to claim 1, wherein the connecting end is formed with an insertion slot, and a part of the shovel piece overlapping with the reinforcing piece partially extends into the insertion slot.

3. The spatula according to claim 2, wherein a part of the shovel piece that does not overlap with the reinforcing piece partially extends into the insertion slot.

4. The spatula according to claim 3, wherein the shovel piece has a first side edge and a second side edge opposite to each other, the second side edge is arc-shaped, and the reinforcing piece is adjacent to an arc top of the second side edge.

5. The spatula according to claim 2, wherein the shovel piece has a first side edge and a second side edge opposite to each other, the second side edge is arc-shaped, and the reinforcing piece is adjacent to an arc top of the second side edge.

6. The spatula according to claim 1, wherein the connecting end is formed with an insertion slot, the reinforcing piece has an insertion portion that does not overlap with the shovel piece, and the insertion portion extends into the insertion slot.

7. The spatula according to claim 6, wherein the connecting end further has two extension potions extending in different directions from the insertion slot, and the two extension portions extend along the edge of the shovel piece.

8. The spatula according to claim 7, wherein the shovel piece has two adjacent side edges, and the reinforcing piece is adjacent to a connection between the two side edges.

9. The spatula according to claim 6, wherein the shovel piece has two adjacent side edges, and the reinforcing piece is adjacent to a connection between the two side edges.

10. The spatula according to claim 1, wherein the shovel piece further has a plurality of penetration holes.

11. The spatula according to claim 1, wherein the coating layer further coats a part or the entire shovel handle.

12. The spatula according to claim 1, wherein the shovel portion is a metal shovel portion, the reinforcing piece is a metal reinforcing piece, the shovel handle is a plastic shovel handle or a wooden shovel handle, and the coating layer is a silicone coating layer or a rubber coating layer.

* * * * *